Figure 1:
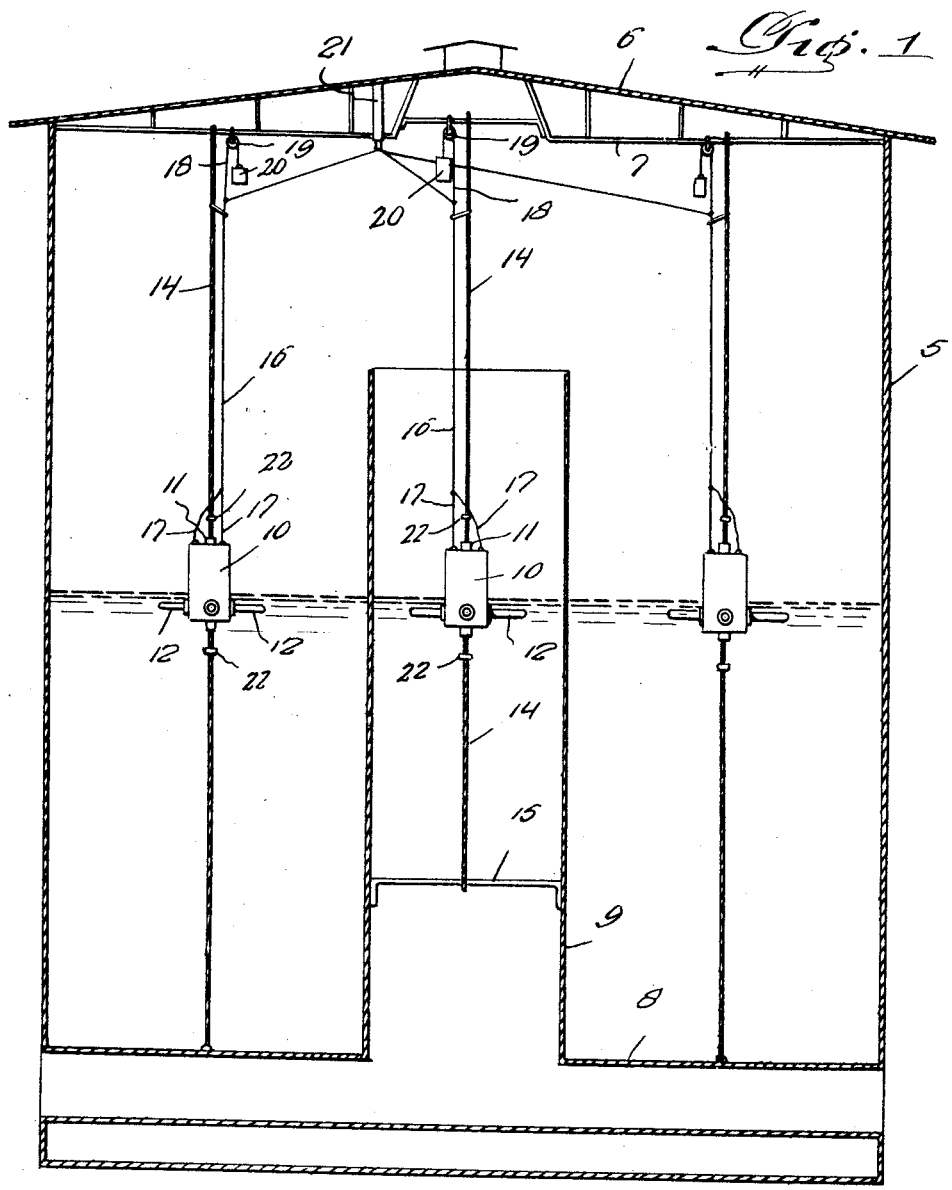

Oct. 15, 1929. E. SIMZER 1,731,506
HEATING APPARATUS FOR PAPER MILL SURGE TANKS
Filed April 23, 1928 2 Sheets-Sheet 2

Inventor
E. Simzer,

By Clarence A. O'Brien
Attorney

Patented Oct. 15, 1929

1,731,506

UNITED STATES PATENT OFFICE

EDGAR SIMZER, OF POTSDAM, NEW YORK

HEATING APPARATUS FOR PAPER-MILL SURGE TANKS

Application filed April 23, 1928. Serial No. 272,279.

The present invention relates to a heating apparatus for surge tanks such as are used at paper mills. Heretofore considerable difficulty has been experienced in having the water in each tank free. The prime object of the invention resides in the provision of electrical heaters that move up and down in the surge tanks on cables and maintain the electric heating elements submerged in the water thereby maintaining the temperature of the water above the freezing point.

A still further very important object of the invention resides in the provision of an apparatus of this nature which is exceedingly simple in its construction, inexpensive to manufacture and install, strong and durable, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
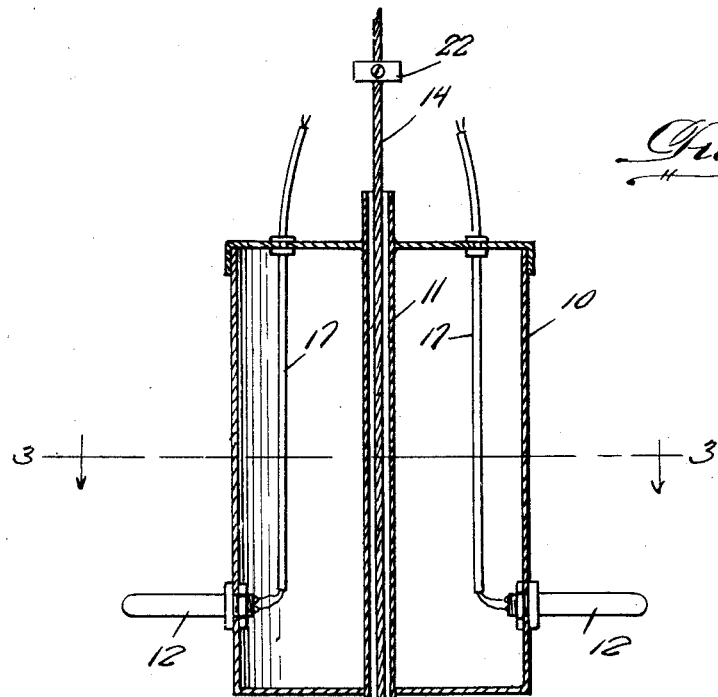
Figure 3:
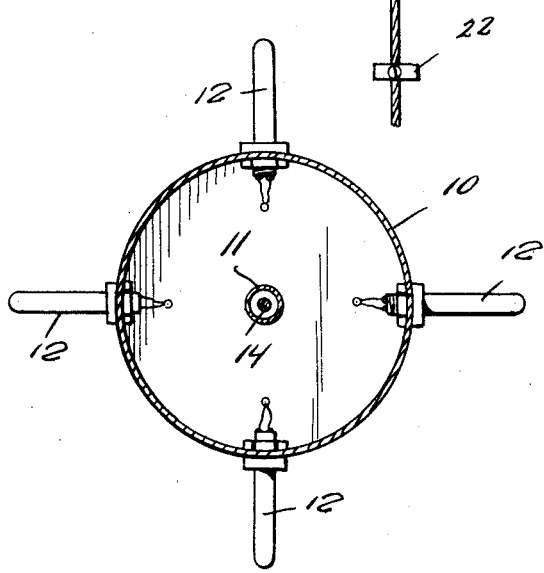

In the drawing:

Figure 1 is a vertical section through a surge tank embodying the features of my invention, Figure 2 is an enlarged detail vertical section through one of the floats, Figure 3 is a transverse section therethrough taken substantially on the line 3—3 of Figure 2.

Referring to the drawings in detail it will be seen that the numeral 5 denotes a surge tank of conventional or any preferred construction which as usual is provided with a roof or top 6 having a supporting structure 7 and in its bottom is provided with a transverse conduit 8 with a hollow riser 9 at the intermediate portion thereof terminating a distance below the roof 6. Numerals 10 denote hollow floats which are provided with tubes 11 projecting through the tops and bottoms thereof coaxially therewith. A plurality of electric heating elements 12 are anchored in the bottom of the float to extend outwardly therefrom preferably radially and in the present instance I have shown merely by way of illustration four of these elements for each float.

I anchor a plurality of cables 14 on the supporting structure 7 to depend downwardly therefrom and some of these cables are anchored to the conduit 8 or in any other suitable manner in the bottom portion of the tank and one of the cables is anchored to a cross piece 15 in the lower portion of the riser 9. These cables extend vertically and through the tubes 11 there being one float on each cable.

Electric conductors 16 have branches 17 leading to the tops of the floats 10 and electrically connected with the electric heating elements 12. These electric conductors 16 have cables, ropes or the like 18 attached thereto and trained over pulleys 19 on the supporting structure 7 and having weights 20 on their ends to counter balance the floats. These weights, however, do not complete the counterbalance of the floats but are sufficient to cause the floats to be positioned at all times as is illustrated in Figure 1 in respect to the water that is so that the heating elements are submerged.

The conduits all are connected to a common conductor 21 leading from a suitable source of electrical energy. Each cable 14 has provided thereon a pair of spaced stops 22 which limit the up and down movement of the float. These stops prevent the float from splashing up and down when there is a surge which is caused when the generators in the power plant are shut down. The surge lasts about a minute or so until the water settles to its normal level again. These stops also prevent any tangles in the wires which might occur if the floats were free to move the full length of the cabe 14. The weights 20 with their cables 18 prevent any slack in the wires 16.

It is thought that the construction, operation and advantages of this invention will now be quite apparent to those skilled in this art without a more detailed description thereof.

It will now be quite apparent to those skilled in this art without a more detailed description thereof. It will be seen that a suitable number of these floats may be employed to keep the temperature of the water above freezing and that the floats will maintain the heating element at the surface where ice is likely to form. It will also be seen that the manner of guiding and mounting the floats is such as to prevent any tangling of the wires and to allow the structure to function without any attention.

The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a surge tank, a cable extending vertically in the surge tank and anchored at its end, a float of hollow construction having a tube extending therethrough and receiving the cable so that the float is free to move up and down vertically with the rise and fall of the water in the surge tank, a plurality of electrical heating elements projecting outwardly from the bottom of the float to be submerged in the water.

2. In a surge tank, a cable extending vertically in the surge tank and anchored at its end, a float of hollow construction having a tube extending therethrough and receiving the cable so that the float is free to move up and down vertically with the rise and fall of the water in the surge tank, a plurality of electrical heating elements projecting outwardly from the bottom of the float to be submerged in the water, means on the cable limiting the up and down movement of the float.

In testimony whereof I affix my signature.

EDGAR SIMZER.